US010214101B2

(12) United States Patent
Fliearman et al.

(10) Patent No.: US 10,214,101 B2
(45) Date of Patent: Feb. 26, 2019

(54) WORK VEHICLE DRIVE ASSEMBLY (71) Applicant: Deere & Company, Moline, IL (US)

(72) Inventors: Steven R. Fliearman, Coffeyville, KS (US); Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 338 days.

(21) Appl. No.: 15/140,090

(22) Filed: Apr. 27, 2016

(65) Prior Publication Data
US 2017/0313180 A1 Nov. 2, 2017

(51) Int. Cl.
F16H 3/44 (2006.01)
B60K 17/04 (2006.01)
B60K 17/06 (2006.01)
F16H 1/28 (2006.01)
F16D 13/76 (2006.01)
F16D 25/10 (2006.01)
F16D 25/0638 (2006.01)

(52) U.S. Cl.
CPC ............ B60K 17/046 (2013.01); B60K 17/06 (2013.01); F16D 13/76 (2013.01); F16D 25/10 (2013.01); F16H 1/28 (2013.01); B60Y 2200/411 (2013.01); F16D 25/0638 (2013.01)

(58) Field of Classification Search
CPC .......... F16H 3/44; B60K 17/046; B60K 17/06
See application file for complete search history.

(56) References Cited

U.S. PATENT DOCUMENTS

| 3,811,544 | A | 5/1974 | Maucher |
| 4,142,615 | A | 3/1979 | Sidles, Jr. et al. |
| 5,024,636 | A | 6/1991 | Phebus et al. |
| 6,652,405 | B2 * | 11/2003 | Staheli ................ B60K 17/046 |
| | | | 180/372 |

(Continued)

FOREIGN PATENT DOCUMENTS

| DE | 1153265 B | 8/1963 |
| DE | 102007006687 A1 | 6/2008 |

(Continued)

OTHER PUBLICATIONS

German Patent and Trade Mark Office, Search Report in German Patent Application No. 10 2017 205 103.5 dated Nov. 21, 2017.

Primary Examiner — Edwin A Young
(74) Attorney, Agent, or Firm — Klintworth & Rozenblat IP LLP (57) ABSTRACT A drive assembly has a drive housing with a gear set and a wheel mount configured to rotate about a rotation axis on a wheel bearing assembly. A clutch component is mounted to a clutch hub and disposed between an input shaft and the gear set to selectively cause rotation of the wheel mount. A clutch actuation assembly moves the clutch component into energized and de-energized states with respect to the input shaft. The clutch actuation assembly has a spring to position the clutch component in one of the energized and de-energized states and a piston to position the clutch component in the other of the energized and de-energized states. The clutch actuation assembly has a reaction plate that is acted upon in a first axial direction by the spring and is acted upon by the piston in a second axial direction.

19 Claims, 7 Drawing Sheets (56) References Cited

U.S. PATENT DOCUMENTS

| | | | |
|---|---|---|---|
| 8,505,658 B2 * | 8/2013 | Wargh | B60K 7/0007 |
| | | | 180/65.51 |
| 8,758,181 B2 | 6/2014 | Calvert | |
| 2009/0247346 A1 | 10/2009 | Hvolka et al. | |
| 2010/0160107 A1 | 6/2010 | Rice et al. | |
| 2011/0124462 A1 | 5/2011 | Meyer et al. | |
| 2013/0252775 A1 | 9/2013 | Wargh et al. | |
| 2013/0260961 A1 * | 10/2013 | Dedo | F16H 61/0059 |
| | | | 477/77 |

FOREIGN PATENT DOCUMENTS

| | | |
|---|---|---|
| DE | 102007003440 A1 | 7/2008 |
| DE | 102014200527 A1 | 7/2015 |
| GB | 2268553 A | 1/1994 |

* cited by examiner

WORK VEHICLE DRIVE ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive arrangements, and in particular to drives for work vehicles.

BACKGROUND OF THE DISCLOSURE

In various work vehicle applications, a drive assembly may be utilized to provide rotational power to various components of the vehicle. In some wheeled or tracked vehicles, such as motor graders, a final drive assembly is mounted to a frame of the vehicle to provide rotational power, at a wheel mount of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the wheel mount.

In some cases, the motors may be operated at one or more different speeds. While the use of multiple speeds in a drive assembly can significantly reduce the cost of the related motors, inverters, and electrical devices, the higher operating speeds of an electric motor significantly increases the ratios required from the drive assembly and can simultaneously result in an increase in size and cost of the overall drive assembly. Arranging and packaging complex assemblies such as these, along with gear trains, shifting assemblies, bearings, shafts and other drive components, in what may be a relatively tight space envelop, particularly in the axial direction, can be a challenge.

SUMMARY OF THE DISCLOSURE

The disclosure provides a work vehicle drive assembly with an improved clutch actuation assembly.

One aspect the disclosure provides a drive assembly receives rotational power from an input shaft rotatable about a rotation axis. The drive assembly has a drive housing with a gear set and a wheel mount configured to rotate about a rotation axis on a wheel bearing assembly. A clutch component is mounted to a clutch hub and disposed between an input shaft and the gear set to selectively cause rotation of the wheel mount. A clutch actuation assembly moves the clutch component into energized and de-energized states with respect to the input shaft. The clutch actuation assembly has a spring to position the clutch component in one of the energized and de-energized states and a piston to position the clutch component in the other of the energized and de-energized states. The clutch actuation assembly has a reaction plate that is acted upon in a first axial direction by the spring and is acted upon by the piston in a second axial direction.

Another aspect the disclosure provides a drive assembly receiving rotational power from an input shaft rotatable about a rotation axis, in which the drive assembly includes a drive housing having a gear set and a wheel mount configured to rotate about the rotation axis on a wheel bearing assembly. A clutch component is mounted at least in part within an annular clutch hub and disposed between the input shaft and the gear set to selectively cause rotation of the wheel mount. A clutch actuation assembly moves the clutch component into energized and de-energized states with respect to the input shaft. The clutch actuation assembly has a spring to position the clutch component in one of the energized and de-energized states and a piston to position the clutch component in the other of the energized and de-energized states. The clutch actuation assembly has a reaction plate that is acted upon by the spring in a first axial direction and by the piston in a second axial direction. The reaction plate includes first and second parts mounted to the clutch hub through associated first and second openings extending radially through the clutch hub so that the piston acts on the reaction plate inside of the clutch hub and the spring acts on the reaction plate outside of the clutch hub.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed drive arrangement, as shown in the accompanying figures of the drawings described briefly above. Various modifications to the example embodiments may be contemplated by one of skill in the art.

As mentioned above, known designs for multi-speed drive assemblies may be unsatisfactory in a number of respects. For example, such drives may exhibit significant complexity, leading to high manufacturing costs and a significant increase in size and weight. This is particularly the case in off-highway and other such work vehicles, such as motor graders, self-propelled sprayers and the like, in which it is desirable for the drive to provide multiple speeds, while at the same time reducing the space envelope required for the drive. In the case of certain in-line drive arrangements, such as final drives, a key envelope dimension is the axial dimension about which certain drive components rotate to drive the wheels or other vehicle components.

In this regard, the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Certain known drive assemblies may include a motor mounted at an end of a gear housing of the drive assembly. The gear housing may be integrally formed with a hub, which may be attached to an external device, such as a wheel or sprocket, in order to provide rotational power from the motor to the external device. One or more planetary (or "epicyclical") gear sets in communication with the motor may be disposed within the gear housing in order to provide a speed reduction of various ratios with respect to the rotational power from the motor. The drive may incorporate various complex assemblies, such as compound planetary sets, to provide multiple speeds and the desired high gear reduction and torque. The axial dimension of such drives gear sets can be larger than desired for certain applications.

The embodiments of the disclosed drive may address various of the issues noted above, as well as provide various additional benefits. Generally, in place of the relatively large shifting assemblies of prior art drives, the shifting assembly, or at least the planetary gear set or clutch components thereof, are positioned such that it substantially fits within (or "under") the wheel bearing support of the drive assembly—i.e., the shifting assembly substantially fits within the axial borders of the wheel bearing support and within inner radial dimension of the wheel bearing support. In this way, the shifting assembly (including, for example, one or more clutch and planetary components) may be more compactly disposed, resulting in a reduced axial dimension.

In certain embodiments the axially compact nature of the shifting assembly may, in part, be facilitated by a relatively large diameter spring and piston arrangement that provides the spring-applied, hydraulically-released clutch energization for effecting different modes of operation of the drive. For example, the shifting assembly may include one or more spring and piston arrangements that engage and disengage a corresponding number of clutch components. The springs may be sized so that may be positioned in a radially different location (e.g., radially outward of) the clutch. This not only reduces the axial space occupied by the shifting assembly, but the use of larger springs also provides for greater axial force to be applied to the clutch components over a shorter axial distance. The more robust springs further work to improve the life of the shifting assembly since less deflection for each actuation of the clutch component is required.

In still other embodiments the shifting assembly may be in the form of a simple single planetary set, thereby reducing cost and complexity of the assembly. For example, the single planetary set may be a 2-speed sun gear input, carrier output configuration. The single planetary arrangement may also be configured to provide neutral and park modes. The neutral mode prevents the wheels from back-driving and over-running the motor, and the park mode locks the vehicle wheels against rotation.

In certain other embodiments, the disclosed drive assembly may have one or more features that facilitate manufacturability and assembly while providing one or more of the aforementioned advantages (e.g., tight packaging and high cycle life). For example, the disclosed drive assembly may have a split spring reaction member that is mounted by a solid annular retainer member. The split spring reaction member may be axially split into two or more parts of the same or different sizes and shapes. The split configuration of the spring reaction member allows reaction tabs of the split spring reaction member to be installed through slots of an annular clutch retainer. The annular retainer member contains and assembles the parts of the split spring reaction member. A large diameter spring at the outer diameter of the annular clutch retainer may act against the split spring reaction member to apply a force to engage a clutch of the drive assembly. The clutch may be released by a piston within the inner diameter of the clutch retainer acting against the reaction tabs of the split spring reaction member. The split configuration further allows the clutch retainer to have a closed end that encloses the piston and forms a piston chamber, and which enhances the structural rigidity and torque carrying capacity of the clutch retainer.

Referring now to the drawings, the disclosed drive assembly may be utilized in the context of a wide range of work vehicles, including, as mentioned, a motor grader. In this regard, while a motor grader is illustrated and described herein as an example work vehicle, one skilled in the art will recognize that principles of the multi-speed drive arrangement disclosed herein may be readily adapted for use in other types of work vehicles, including, for example, various crawler dozer, loader, backhoe and skid steer machines used in the construction industry, as well as various other machines used in the agriculture and forestry industries, such as tractors, sprayers, skidders and the like. As such, the present disclosure should not be limited to applications associated with motor graders or the particular example motor grader shown and described.

Figure 1:
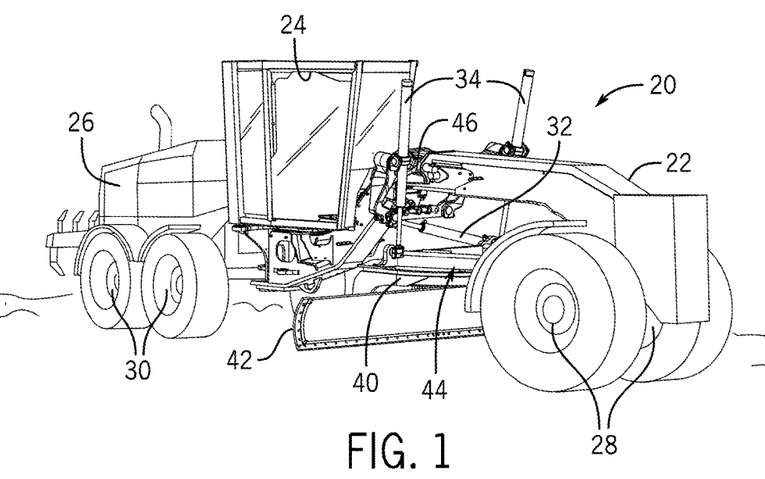
FIG. 1 is perspective view of a work vehicle in the form of a motor grader in which the drive assembly of this disclosure may be incorporated.

As shown in FIG. 1, a motor grader 20 may include a main frame 22 supporting an operator cabin 24 and a power plant 26 (e.g., a diesel engine) operably coupled to power a drive train. The main frame 22 is supported off of the ground by ground-engaging steered wheels 28 at the front of the machine and by two pairs of tandem drive wheels 30 at the rear of the machine. The power plant may power one or more hydraulic pumps (not shown), which pressurize hydraulic fluid in a hydraulic circuit including various electro-hydraulic valves, hydraulic drives and hydraulic actuators, including a circle shift actuator 32, lift actuators 34, a blade shift actuator (not shown) and a circle rotate drive (not shown). In the illustrated example, the main frame 22 has an articulation joint (not shown) between the operator cabin 24 and power plant 26 that allows the front section of the main frame 22 to deviate from the centerline of the rear section of the main frame 22, such as during a turning operation to shorten the effective wheelbase of the motor grader 20, and thus, shorten the turning radius of the machine. A circle 40 and blade 42 assembly is mounted to the main frame 22 in front of the operator cabin 24 by a drawbar 44 and a lifter bracket 46, which in certain embodiments may be pivotal with respect to the main frame 22. Cylinders of the lift actuators 34 may be mounted to the lifter bracket 46, and pistons of the lift actuators 34 may be connected to the circle 40 so that relative movement of the pistons may raise, lower and tilt the circle 40, and thereby the blade 42. The circle 40, via the circle drive and various actuators, causes the blade 42 to be rotated relative to a vertical axis as well as shifted sideways or laterally in relation to the main frame 22 and/or the circle 40. The drive wheels 30 of the motor grader 20 are driven by a drive assembly (not shown in FIG. 1) configured as a final drive assembly that is mounted to frame 22 of motor grader 20 in order to provide motive power to the drive wheels 30. It will be understood that the disclosed drive assembly may be utilized as a final drive assembly, as illustrated for providing motive power to a ground-engaging element of the vehicle (e.g., wheels, tracks, or the like), or may be utilized to provide rotational power to other types of devices.

Figure 2:
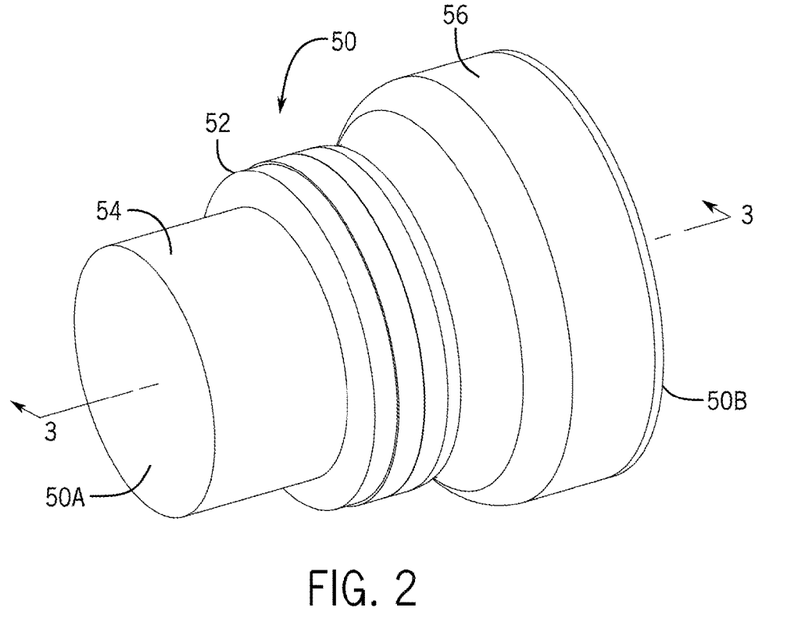
FIG. 2 is a perspective, exterior overview of an example drive assembly according to the present disclosure.

FIG. 2 illustrates the exterior of an example drive assembly 50 that may be used to turn the drive wheels 30 shown in FIG. 1. The drive assembly 50 generally includes a mounting assembly (not shown) to facilitate attachment to the frame 22 of the motor grader 20. The mounting assembly may be included as a part of a larger drive housing 52 of the drive assembly 50, and is configured to remain relatively stationary during operation of the drive assembly 50, as will described in further detail below. A drive motor 54 may be attached to the drive housing 52 (e.g., via a motor mount) at an axial end 50A of the drive assembly 50, such that the drive motor 54 may be held in an appropriately stationary orientation for delivery of rotational power to the drive assembly 50. The drive motor 54 may be implemented as an electric motor (or other power source, such as a hydraulic motor) including a drive shaft (not shown in FIG. 2) extending towards another axial end 50B of the drive assembly 50. In other embodiments, alternate configurations are possible. The drive assembly 50 may further include a wheel mount 56, which may be configured to directly engage the wheels 30 of the motor grader 20, or may mount an intermediate power transmission component. In any case, rotation of the wheel mount 56 may drive movement of the wheels 30, and thereby movement of the motor grader 20.

As mentioned briefly above, drive assemblies in accordance with various embodiments are configured such that their shifting assemblies, or at least the planetary sets and clutch components thereof, are located substantially "beneath" or "within" their wheel bearing supports (in some cases the wheel bearings themselves) in order to minimize the overall axial dimension of the drive assembly. Generally, a wheel bearing assembly may include one, two, or more wheel bearings configured in a variety of arrangements, as described in further detail below, and a bearing support may have any suitable shape and structure configured to provide structural support (e.g., axial, tangential, and/or radial support) to the wheel bearing assembly. Also, the shifting assembly may include a variety of components, such as clutch packs, actuators, and gears (e.g., a planetary gear arrangement described below) that together allow the drive assembly to implement a variety of modes, such as "high", "low", "neutral" and "park" modes (referred to respectively as simply H, L, N and P modes herein).

Figure 3:
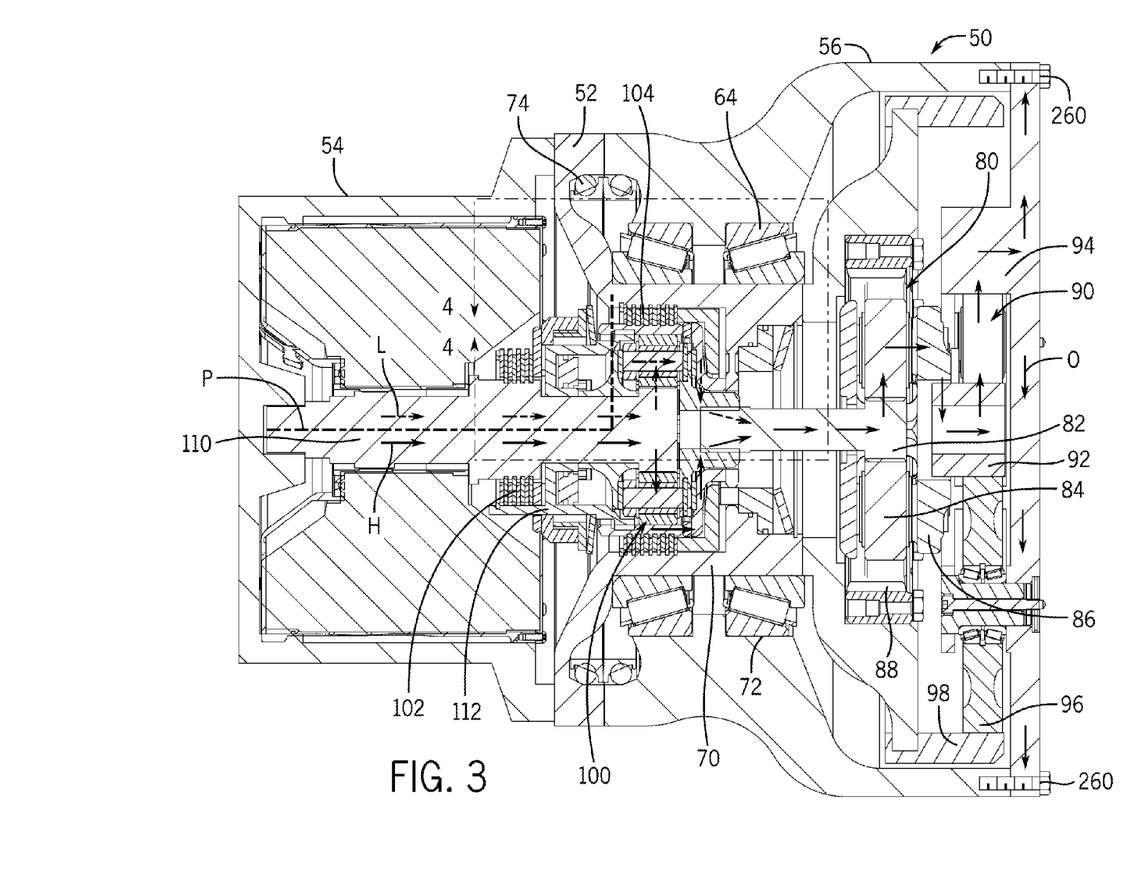
FIG. 3 is a side sectional view of the example drive assembly of FIG. 2 taken along line 3-3 of FIG. 2.
Figure 6:
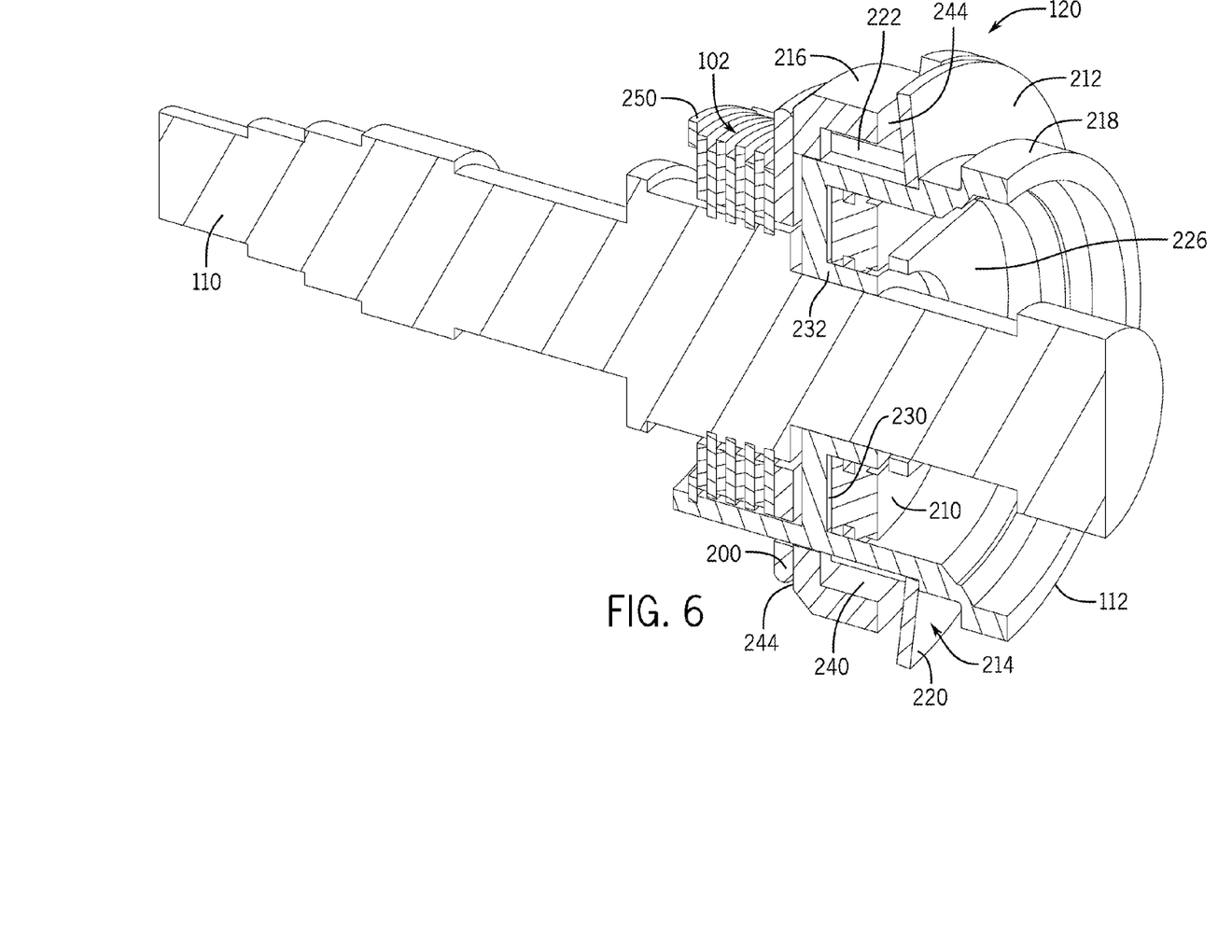
FIG. 6 is a perspective sectional view thereof.
Figure 7:
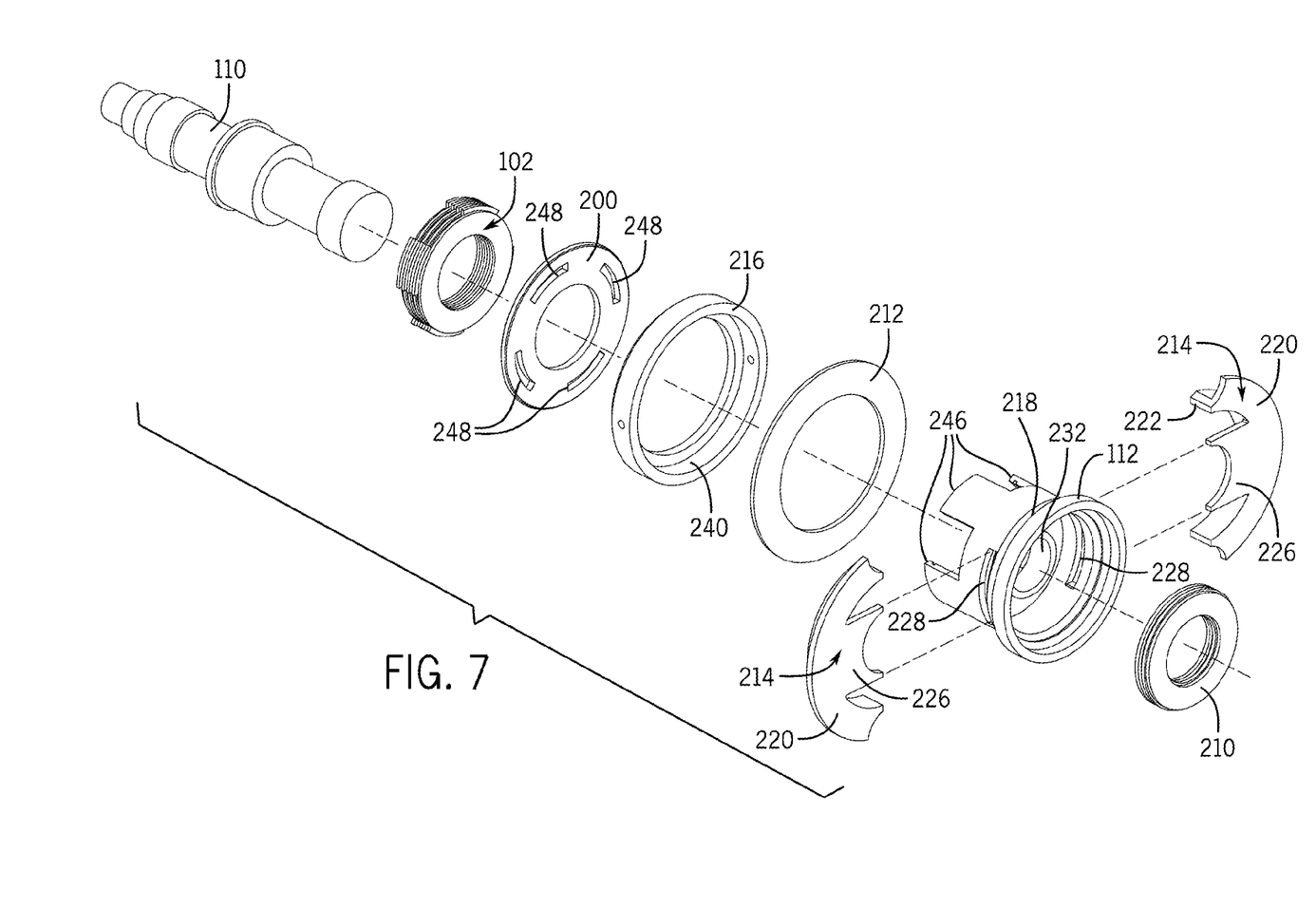
FIG. 7 is an exploded assembly view thereof.

FIG. 3 is a side sectional view of the example drive assembly 50. As a preliminary matter, it will be appreciated that various components (or assemblies) of the drive assembly 50 may generally exhibit radial symmetry, such that for these components the views depicted herein may represent a view of any number of diametric planes through the drive assembly 50. The example drive assembly 50 includes the wheel mount 56 that rotates with respect to a mounting frame or drive housing 52. The drive housing 52 is configured to be securely mounted to the frame 22 of the motor grader 20, while the wheel mount 56 is configured to be securely mounted to one of the drive wheels 30 of the motor grader 20. The drive assembly 50 includes a bearing assembly 64 that includes two annular roller bearing assemblies, as shown. Inner diameters of the bearings 64 are mounted to (i.e., radially and axial supported by) a housing hub 70 that mounts to (e.g., bolts) or is integrally formed with the drive housing 52. The outer diameter of the bearings 64 are mounted to a bearing support 72 that connects to (e.g., bolts) or is integrally formed with, and thus forms part of, the wheel mount 56. Face seals 74 may be mounted in annular grooves formed in the opposing faces of the housing hub 70 and the bearing support 72 to retain fluids (e.g., hydraulic fluid, lubricant, coolant and the like) and block external debris and contaminants. A drive motor 54 (e.g., an electric motor) mounts to the inboard (left in FIG. 6) axial end of the drive housing 52.

The drive assembly 50 includes three planetary gear sets, including reduction planetary sets 80, 90 and a shifting planetary set 100. The drive assembly 50, and specifically the range shifting assembly thereof, includes two clutch components (or "clutch packs") 102, 104 that are communicatively coupled to the shifting planetary set 100. Briefly, when the clutch pack 102 is engaged (or "energized"), the drive assembly 50 operates in a low speed mode L. When clutch pack 104 is engaged, the drive assembly 50 operates in a high speed mode H. The drive assembly 50 operates in a neutral mode N when neither clutch pack 102, 104 is engaged and in a park mode P when both clutch packs 102, 104 are engaged. The modes of operation are described further below.

Figure 4:
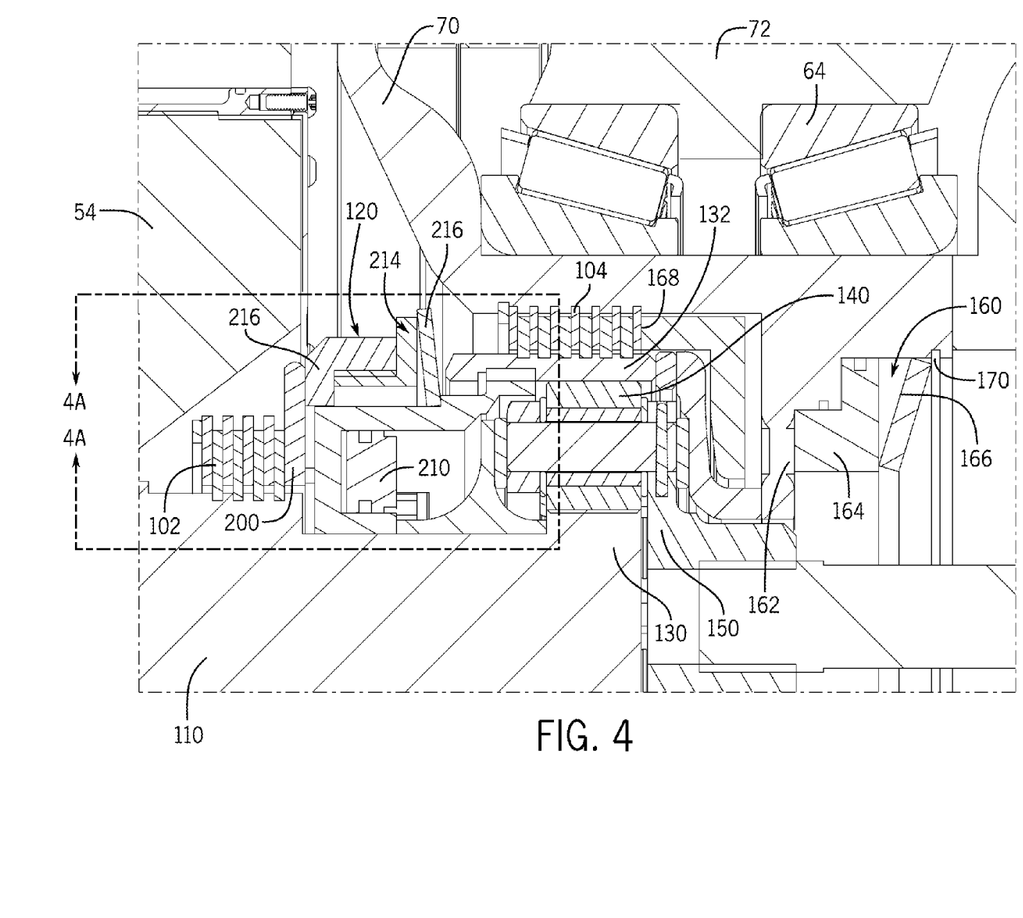
FIG. 4 is an enlarged section view of area 4-4 of FIG. 3.

More specifically now, with reference to FIGS. 3 and 4, the drive assembly 50 includes an input shaft 110 driven by the drive motor 54 to which is splined either the set of friction disks or separator disks of the clutch pack 102. The other set of separator disks or friction disks is splined to a clutch hub 112 at the inner diameter of a recessed pocket 114. Engagement and disengagement of the clutch pack 102 are performed by an actuator assembly 120, described in detail below. The actuator assembly 120 provides spring-applied, hydraulically-released action for the clutch pack 102. The use of a large diameter spring provides for greater axial force to be applied to the clutch pack 102 over a shorter axial distance, which improves the energization and life of the clutch pack 102, and thereby the drive assembly 50.

The shifting planetary set 100 receives rotational input from the input shaft 110 from one of two power paths, namely via a splined interface of the input shaft 110 and a sun gear 130 and via a toothed interface of the clutch hub 112 and a ring gear 132. The sun gear 130 receives rotational input from the input shaft 110 continuously (except when the input shaft 110 is held stationary (e.g., via motor control logic)). The ring gear 132 receives rotational input only when the clutch pack 102 is engaged, and the ring gear 132 rotates only when the clutch pack 104 is disengaged. The shifting planetary set 100 includes a plurality of planet gears 140 (e.g., six in the example embodiment, although only two are shown in FIG. 3) that are supported on pinion shafts of a carrier 150. The carrier 150 is splined to a second stage sun shaft 82. Thus, in this example embodiment, the shifting planetary set 100 is a sun-in, carrier-out single planetary set.

The shifting planetary set 100 (and the clutch pack 104) fit axially within the axial borders of the bearing support 72, as shown, as well as radially within the inner diameter of the bearing support 72. The simple, single planetary configuration aids in the axially compactness of the drive assembly 50. Yet, the shifting planetary set 100 provides gear ratios for two output speeds and neutral as well as facilitates a park brake feature depending on the state of the two clutch packs 102, 104.

The clutch pack 104 is located radially between the housing hub 70 and the ring gear 132 of the shifting planetary set 100, with either the set of friction disks or separator disks being splined to the inner or outer diameter of the respective components. Engagement and disengagement of the clutch pack 104 are performed by another actuator assembly 160 that is mounted to the housing hub 70, an end of which forms a piston chamber 162 that cooperates with an annular piston 164 and a spring 166. In this embodiment, the components of the actuator assembly 160 are located axially adjacent to the clutch pack 104, and, at least in part, radially outward of the shifting planetary set 100 so as to further optimize the axial compactness of the drive assembly 50. In operation, the actuator assembly 160 is configured so that the spring 166 applies a force acting (leftward in FIG. 3) on the piston 164 such that an outer peripheral face 168 of which is capable of bringing the interleaved friction and separator disks into close frictional contact so as to engage the clutch pack 104 and cause the ring gear 132 to be fixed against rotation with the housing hub 70. Introducing hydraulic fluid pressure between the annular piston 164 and the piston chamber 162, which is dynamically sealed by a seal and groove arrangement at the outer diameter of the piston 164, applies a force acting (to the right in FIG. 3) on the piston 164 sufficient to overcome the spring 166 force and sufficiently separate the friction and separator disks to disengage the clutch pack 104 to disconnect the ring gear 132 from the housing hub 70 and allow it to be rotated. In this example, the spring 166 is a Belleville-type spring that fits within a recess in the housing hub 70 and is captured axially by a snap ring 170.

As mentioned above, and shown in FIGS. 4-7, the clutch pack 102 is energized and de-energized by the actuator assembly 120. In the illustrated example, the actuator assembly 120 includes an annular reaction plate 200, an annular piston 210, a spring 212, a split spring reaction plate 214, and an annular retaining collar 216. In this example, the spring 212 is a large diameter Belleville-type spring that fits about a portion of the outer diameter of the clutch hub 112. An inner diameter of the spring 212 is captured axially by a raised shoulder 218 of the clutch hub 112, and an outer diameter of the spring 212 acts against the split spring reaction plate 214. Moreover, in the example shown, the split spring reaction plate 214 has two axially symmetric parts. In other embodiments, however, the split spring reaction plate 214 could have three or more parts. Each part of the split spring reaction plate 214 has a radial flange 220 extending out from an axially extending annular body 222 that fits about the input shaft 110. Each part of the split spring reaction plate 214 also has a tab 226 that extends in a radial direction inwardly with respect to the radial flange 220 and annular body 222. The parts of the split spring reaction plate 214 assemble to the clutch hub 112 by inserting the tabs 226 into associated slots 228 in the clutch hub 112. The slots 228 are larger, in the axial direction, than the axial thickness of the tabs 226 to allow for relative axial movement of the tabs 226, and thereby the parts of the split spring reaction plate 214, when engaging and disengaging the clutch pack 102. The inner ends of the tabs 226 may be sized and configured (e.g., notched) so as not to interfere with the input shaft 110. The slots 228 are located so that the tabs 226 are close to, but spaced from the piston 210, which slides within a piston chamber 230 axially along a central portion 232 of the clutch hub 112. The piston 210 may have inner and outer circumferential grooves and face seals to dynamically seal a pressure area of the piston chamber 230 to an axial side of the piston 210 opposite the tabs 226.

The parts of the split spring reaction plate 214 are contained and secured to the clutch hub 112 by the retaining collar 216 via suitable connection (e.g., set screws). The retaining collar 216 is configured to define an annular pocket 240 receiving the annular bodies 222 of the parts of the split spring reaction plate 214 and so that a circular end face 242 of the retaining collar 216 abuts an axial side of the radial flanges 220 opposite the spring 212. An opposite end face 244 abuts the annular reaction plate 200, which is captured by and abuts the clutch pack 102. In the illustrated example, the clutch hub 112 has a segmented end, with axially extending gaps or spaces defining axially extending tabs 246 that fit through associated slots 248 in the reaction plate 200. The clutch hub 112 is retained to the input shaft 110 by a snap ring 250, which also provides a backstop for the clutch pack 102. The split configuration allows the spring 212 to be mounted about the outside of the clutch hub 112 and allows the clutch hub 112 to have a solid radial wall forming the piston chamber 230 that enhances the structural rigidity and torque carrying capacity of the clutch hub 112. The large diameter of the spring 212 allows for robust application of the clutch pack 102 in an axially compact manner.

Figure 4A:
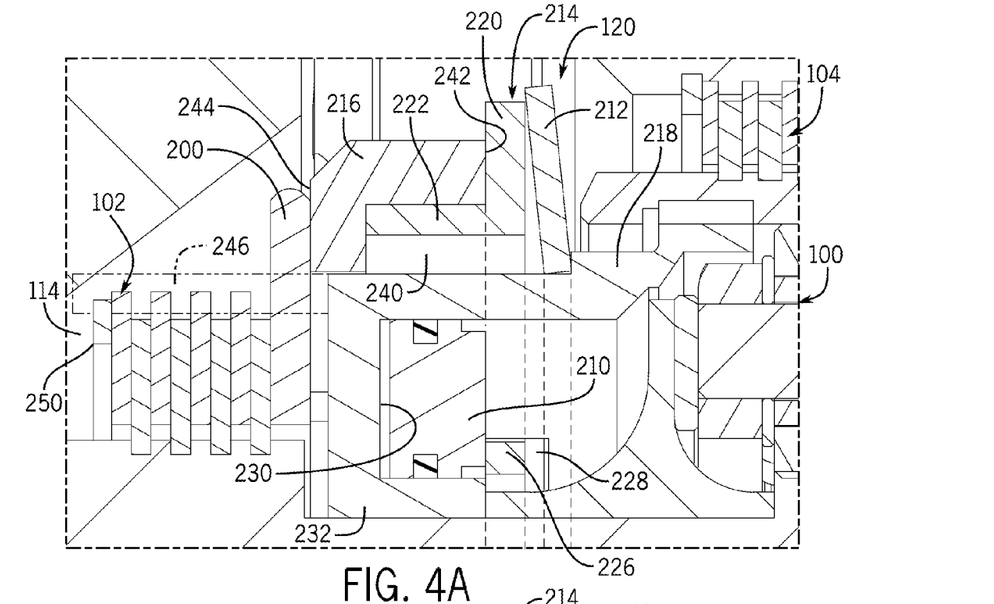
FIG. 4A is an enlarged section view of area 4A-4A of FIG. 4, showing a piston in a first position.
Figure 4B:
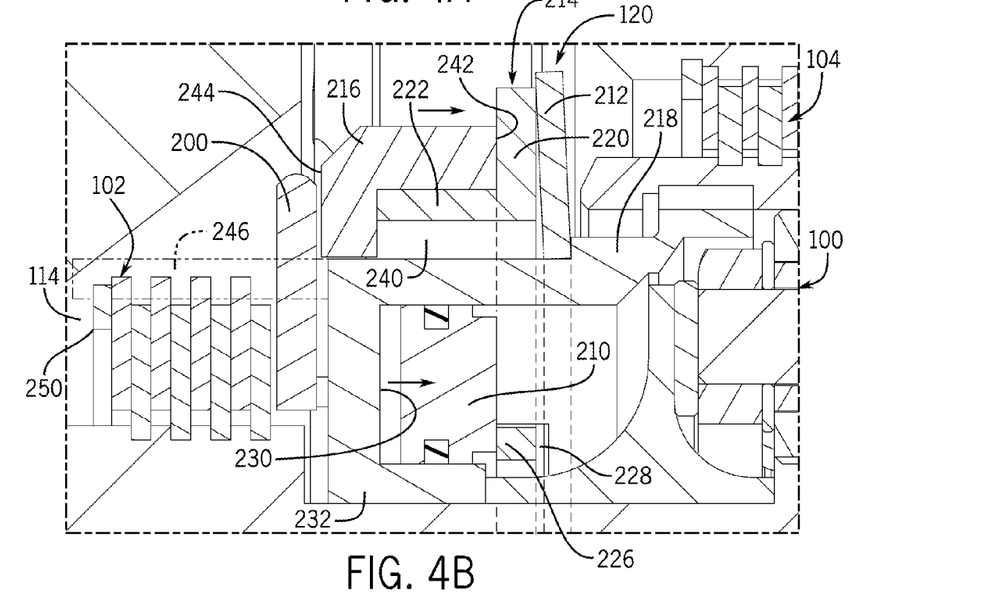
FIG. 4B is a view similar to FIG. 4A albeit showing the piston in a second position.
Figure 5:
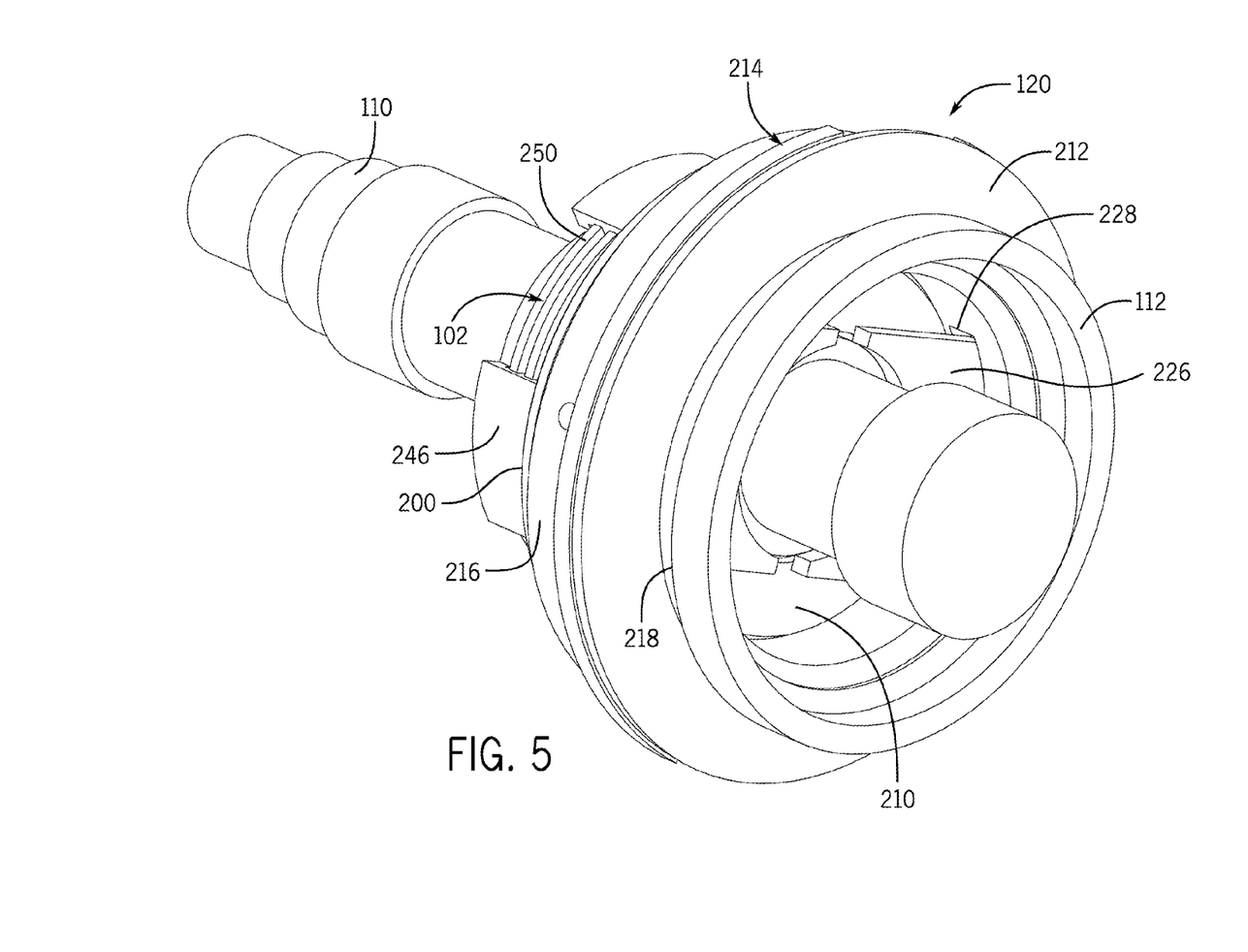
FIG. 5 is a perspective view of an example clutch component and clutch actuation assembly mounted to an input shaft.

The actuator assembly 120 is configured so that the spring 212 applies a force acting (leftward in FIG. 4) on the radial flanges 220 of the split spring reaction plate 214, the annular bodies 222 of which press against the retaining collar 216, which, in turn, presses the reaction plate 200 against the clutch pack 102, thereby bringing the interleaved friction and separator disks into close frictional contact so as to engage cause the clutch hub 112, as shown in FIG. 4A, so that the clutch hub 112 rotates with the input shaft 110. Introducing hydraulic fluid pressure into the piston chamber 230 between the clutch hub 112 and the piston 210 applies a force acting (rightward in FIG. 4) on the piston 210, and in turn the tabs 226, that is sufficient to overcome the force of the spring 212 to sufficiently separate the friction and separator disks to disengage the clutch pack 102 and disconnect the clutch hub 112 from the input shaft 110, as shown in FIG. 4B.

Having described the example shifting assembly in detail, the modes of the drive assembly 50 will now be described with continued reference to FIGS. 3, 4A and 4B. The power flow path for the low speed mode L is shown generally by dashed arrows L. As mentioned, the low speed mode L of the drive assembly 50 is effected by the clutch pack 102 being engaged and the clutch pack 104 being disengaged. As the drive motor 54 rotates the input shaft 110 with the clutch pack 102 biased by the spring 212 into the engaged position (as shown in FIG. 4A), the clutch hub 112 rotates the ring gear 132, which is permitted by hydraulic pressure being applied to the actuator assembly 160 to disengage the clutch pack 104. In this state, the ring gear 132 and the sun gear 130 are rotating together (effectively "locked") such that the shifting planetary set 100 rotates as a unit at the speed of the input shaft 110. Power thus flows from the carrier 150 to the second stage sun shaft 82 to the other planetary sets, namely the reduction planetary sets 80 and 90 to rotate the wheel mount 56 and thereby drive the drive wheels 30, as described below.

The high speed mode H of the drive assembly 50 is effected by the clutch pack 102 being disengaged and the clutch pack 104 being engaged. Hydraulic pressure biases against the spring 212 to release the clutch pack 102 and thus disconnect the clutch hub 112, and the spring 166 closes the clutch pack 104 to lock the ring gear 132 to the housing hub 70. In this state, the input shaft 110 rotates only the sun gear 130, which drives the planet gears 140 to orbit within the fixed ring gear 132 and rotate the carrier 150 at a different speed than the input shaft 110 rotates. Again, power flows from the carrier 150 to the second stage sun shaft 82 to the reduction planetary sets 80 and 90. The power flow path for the high speed mode H is shown generally by solid arrows H.

Neutral mode N and park mode P of the drive assembly 50 are effected by the clutch packs 102, 104 being simultaneously disengaged and engaged, respectively. In neutral mode N, disengagement of the clutch packs 102, 104 causes the ring gear 132 to neither be locked nor driven to rotate, but rather to be freely rotatable. As a result, the shifting planetary set 100 does not turn the carrier 150, and thus does not output power to the second stage sun shaft 82. Rather, if the vehicle is moving, forces acting on the drive wheels 30 may tend to counter-rotate the reduction planetary sets 80 and 90, and thereby the second stage sun shaft 82, which in turn may counter-rotate the carrier 150 and the shifting planetary set 100. In order to prevent back-driving the drive motor 54, motor control logic maybe applied to hold the input shaft 110 stationary by issuing a zero speed motor command signal. In park mode P, with both clutch packs 102, 104 locked up, the input shaft 110 is held stationary by a fixed mechanical connection to the housing hub 70 via the clutch hub 112 and the ring gear 132. The drive assembly 50 is thus braked. The mechanical path for the park mode P is shown generally by dot-dashed line P.

The power flow from the shifting planetary set 100 to the drive wheels 30 is the same in the L and H modes and shown generally by the solid arrows O beginning at the second stage sun shaft 82. As shown, rotation of the second stage sun shaft 82 engages three second stage planet gears 84 (two shown in FIG. 3) of the reduction planetary set 80. The second stage planet gears 84 revolve within a second stage ring gear 88 and are mounted to pinion shafts of a second stage carrier 86, which is also splined to a third stage sun gear 92 of the reduction planetary set 90. Rotation of the third stage sun gear 92 engages three third stage planet gears 96 (two shown) that revolve within a third stage ring gear 98 and are mounted to pinion shafts of a third stage carrier 94, which couples to the wheel mount 56 (e.g., via bolts 260). The wheel mount 56 mounts and drives the drive wheels 30. This configuration causes power to flow to the drive wheels 30 at a corresponding gear ratio for each speed mode.

The above describes example embodiments of a compact drive assembly that may provide deep gear reduction ratios and high torque. As non-limiting examples, the above-described constructions are suitable to provide a drive assembly with gear reduction ratios of about 100-150 and output torque of about 20,000-25,000 Nm. This functionality can be achieved in an assembly having a small form-factor, such as in which the wheel mount dimension is about 500-600 mm (e.g., 535 mm) in diameter and about 300-400 mm (e.g., 370 mm) in the axial dimension.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A drive assembly receiving rotational power from an input shaft rotatable about a rotation axis, the drive assembly comprising:
    a drive housing having a gear set and a wheel mount configured to rotate about the rotation axis on a wheel bearing assembly;
    a clutch component mounted to a clutch hub and disposed between the input shaft and the gear set to selectively cause rotation of the wheel mount, the clutch hub, at least in part, having an annular body with an inner periphery and an outer periphery; and
    a clutch actuation assembly for moving the clutch component into energized and de-energized states with respect to the input shaft, the clutch actuation assembly having a spring disposed about the outer periphery of the clutch hub to position the clutch component in one of the energized and de-energized states and a piston disposed within the inner periphery of the clutch hub to position the clutch component in the other of the energized and de-energized states, the clutch actuation assembly having a reaction plate that is acted upon by the spring in a first axial direction and by the piston in a second axial direction.

2. The drive assembly of claim 1, wherein the reaction plate includes at least two parts mounted to the clutch hub through openings extending from the outer periphery to the inner periphery so that the piston acts on the reaction plate inside of the clutch hub and the spring acts on the reaction plate outside of the clutch hub.

3. The drive assembly of claim 2, wherein the reaction plate has a radial flange engaged by the spring.

4. The drive assembly of claim 3, wherein the reaction plate has an axial leg; and
    wherein the clutch actuation assembly includes a retainer ring extending about the axial leg of the reaction plate to retain the at least parts of the reaction plate within the openings of the clutch hub.

5. The drive assembly of claim 4, wherein the clutch actuation assembly includes a clutch reaction plate disposed axially between the clutch component and the retainer ring to physically engage the clutch component when in the energized state.

6. The drive assembly of claim 5, wherein the clutch component is a pack of annular disks; and
wherein the clutch hub defines a cylindrical clutch pocket in which the pack of annular disks are disposed.

7. The drive assembly of claim 6, wherein the clutch hub defines a piston chamber on a side of a partition wall opposite the clutch pocket that contains the piston.

8. The drive assembly of claim 7, wherein the partition wall includes an opening therein through which the input shaft extends.

9. The drive assembly of claim 1, wherein the piston is hydraulically actuated and acts on the reaction plate against the spring to move the clutch component to the de-energized state.

10. The drive assembly of claim 1, further including a second clutch component coupled to the gear set;
wherein energizing the clutch component corresponds to a first rotational speed of the wheel mount, and energizing the second clutch component corresponds to a second rotational speed of the wheel mount that is greater than the first rotational speed.

11. The drive assembly of claim 10, further including a second clutch actuator assembly for engaging and disengaging the second clutch component;
wherein the second clutch actuator assembly includes a spring and a hydraulic piston.

12. The drive assembly of claim 1, wherein the gear set is a single planetary set that includes a single sun gear, a single ring gear and a single carrier for carrying planet gears that rotatably mesh with the sun and ring gears; and
wherein the input shaft rotates at least one of the sun gear and the ring gear; and
wherein the carrier provides rotational output to the wheel mount.

13. A drive assembly receiving rotational power from an input shaft rotatable about a rotation axis, the drive assembly comprising:
a drive housing having a gear set and a wheel mount configured to rotate about the rotation axis on a wheel bearing assembly;
a clutch component mounted to a clutch hub and disposed between the input shaft and the gear set to selectively cause rotation of the wheel mount;
a clutch actuation assembly for moving the clutch component into energized and de-energized states with respect to the input shaft, the clutch actuation assembly having a spring to position the clutch component in one of the energized and de-energized states and a piston to position the clutch component in the other of the energized and de-energized states, the clutch actuation assembly having a reaction plate that is acted upon by the spring in a first axial direction and by the piston in a second axial direction; and
a second clutch component coupled to the gear set;
wherein energizing the clutch component corresponds to a first rotational speed of the wheel mount, and energizing the second clutch component corresponds to a second rotational speed of the wheel mount that is greater than the first rotational speed;
wherein the gear set is a planetary set;
wherein engagement of the clutch component couples the input shaft to a ring gear of the planetary set for co-rotation of the ring gear with the input shaft; and
wherein engagement of the second clutch component couples the ring gear of the planetary set to the drive housing to fix the ring gear against rotation.

14. The drive assembly of claim 13, wherein the clutch hub is mechanically interfaced with the ring gear to effect rotation of the ring gear with the input shaft when the clutch component is engaged.

15. The drive assembly of claim 14, wherein the clutch component is in part splined to the input shaft and in part splined to the clutch hub; and
wherein the clutch hub includes a toothed periphery that engages a toothed inner diameter of the ring gear of the planetary set.

16. A drive assembly receiving rotational power from an input shaft rotatable about a rotation axis, the drive assembly comprising:
a drive housing having a gear set and a wheel mount configured to rotate about the rotation axis on a wheel bearing assembly;
a clutch component mounted at least in part within an annular clutch hub and disposed between the input shaft and the gear set to selectively cause rotation of the wheel mount; and
a clutch actuation assembly for moving the clutch component into energized and de-energized states with respect to the input shaft, the clutch actuation assembly having a spring to position the clutch component in one of the energized and de-energized states and a piston to position the clutch component in the other of the energized and de-energized states, the clutch actuation assembly having a reaction plate that is acted upon by the spring in a first axial direction and by the piston in a second axial direction;
wherein the reaction plate includes first and second parts mounted to the clutch hub through associated first and second openings extending radially through the clutch hub so that the piston acts on the reaction plate inside of the clutch hub and the spring acts on the reaction plate outside of the clutch hub.

17. The drive assembly of claim 16, wherein the reaction plate has a radial flange engaged by the spring.

18. The drive assembly of claim 17, wherein the reaction plate has an axial leg; and
wherein the clutch actuation assembly includes a retainer ring extending about the axial leg of the reaction plate to retain the at least parts of the reaction plate within the openings of the clutch hub.

19. The drive assembly of claim 16, further including:
a second clutch component coupled to the gear set; and
a second clutch actuator assembly for engaging and disengaging the second clutch component, the second clutch actuator assembly having a spring and a hydraulic piston;
wherein energizing the clutch component corresponds to a first rotational speed of the wheel mount, and energizing the second clutch component corresponds to a second rotational speed of the wheel mount that is greater than the first rotational speed.

* * * * *

UNITED STATES PATENT AND TRADEMARK OFFICE
CERTIFICATE OF CORRECTION

| | | |
|---|---|---|
| PATENT NO. | : 10,214,101 B2 | Page 1 of 1 |
| APPLICATION NO. | : 15/140090 | |
| DATED | : February 26, 2019 | |
| INVENTOR(S) | : Fliearman et al. | |

It is certified that error appears in the above-identified patent and that said Letters Patent is hereby corrected as shown below:

In the Claims

Column 10, Claim 4, Line 61, delete "at least parts" and insert -- at least two parts --, therefor.

Column 12, Claim 18, Line 48, delete "at least parts" and insert -- first and second parts --, therefor.

Signed and Sealed this
Sixth Day of August, 2019

Andrei Iancu
*Director of the United States Patent and Trademark Office*